United States Patent
Erlenmaier et al.

(10) Patent No.: US 9,993,759 B2
(45) Date of Patent: Jun. 12, 2018

(54) FILTER MEANS AND FILTER ELEMENT FOR TREATING A FLUSHING LIQUID FOR MATERIAL-REMOVING MACHINING AND METHOD FOR MATERIAL-REMOVING MACHINING

(71) Applicant: Sefar AG, Heiden (CH)

(72) Inventors: Isabell Erlenmaier, St. Gallen (CH); Christian Dietmayer, Lindau (DE); Christian Gurtner, Heiden (CH); Christoph Maurer, Zurich (CH)

(73) Assignee: Sefar AG, Heiden (CH)

( * ) Notice: Subject to any disclaimer, the term of this patent is extended or adjusted under 35 U.S.C. 154(b) by 432 days.

(21) Appl. No.: 14/769,631

(22) PCT Filed: Jun. 26, 2014

(86) PCT No.: PCT/EP2014/063571
§ 371 (c)(1),
(2) Date: Aug. 21, 2015

(87) PCT Pub. No.: WO2015/036135
PCT Pub. Date: Mar. 19, 2015

(65) Prior Publication Data
US 2016/0001208 A1    Jan. 7, 2016

(30) Foreign Application Priority Data

Sep. 11, 2013  (EP) ..................................... 13183959

(51) Int. Cl.
| | | |
|---|---|---|
| *B01D 39/08* | (2006.01) | |
| *D03D 1/00* | (2006.01) | |
| *B24B 55/12* | (2006.01) | |
| *B01D 35/02* | (2006.01) | |

(52) U.S. Cl.
CPC ........... *B01D 39/083* (2013.01); *B01D 35/02* (2013.01); *B01D 39/086* (2013.01); *B24B 55/12* (2013.01); *D03D 1/00* (2013.01); *B01D 2239/0654* (2013.01); *B01D 2239/1216* (2013.01); *B01D 2239/1291* (2013.01)

(58) Field of Classification Search
None
See application file for complete search history.

(56) References Cited

U.S. PATENT DOCUMENTS

| | | | |
|---|---|---|---|
| 3,327,866 A | 6/1967 | Pall et al. | |
| 5,944,197 A * | 8/1999 | Baltzer | B01D 46/10 209/400 |
| 6,015,499 A | 1/2000 | Hayden | |
| 2002/0079263 A1* | 6/2002 | Schulte | B01D 29/012 210/388 |
| 2013/0146529 A1* | 6/2013 | Schwender | B01D 39/083 210/490 |

FOREIGN PATENT DOCUMENTS

DE    2627283 A1 * 12/1977 ........... B01D 39/083

OTHER PUBLICATIONS

International Preliminary Report on Patentability and Translation of Written Opinion of the International Searching Authority; PCT/EP2014/063571 dated Mar. 15, 2016.
International Search Report for PCT/EP2014/063571 dated Sep. 30, 2014.

* cited by examiner

*Primary Examiner* — Krishnan S Menon
*Assistant Examiner* — Ryan B Huang
(74) *Attorney, Agent, or Firm* — Studebaker & Brackett PC

(57) ABSTRACT

The invention relates to a filter device for treating a rinsing liquid for material-removing machining, said filter device having a filter element through which the rinsing liquid can be conducted for separating removed material particles. In order to increase the service life, the filter element is provided with a filter fabric, on the filtration upper side of which are formed fabric pores in the form of distinctive longitudinal slots which have a ratio of length to width of ≥4:1.

12 Claims, No Drawings

FILTER MEANS AND FILTER ELEMENT FOR TREATING A FLUSHING LIQUID FOR MATERIAL-REMOVING MACHINING AND METHOD FOR MATERIAL-REMOVING MACHINING

The invention relates to a filter means for treating a flushing liquid for material-removing machining, with a filter element, through which the flushing liquid can be passed for separating removed material particles, in accordance with the preamble of claim 1.

The invention further relates to a filter element for such a filter means and a method for material-removing machining, wherein the removed material particles are led away by a flushing liquid and separated from the flushing liquid by a filter means, in accordance with the preamble of claim 12.

In material-removing machining, especially in metal machining, carried out by means of a machine tool a flushing liquid is fed continuously to the material-removing tool. The flushing liquid serves, in particular, to wash away the material particles removed during machining and thereby withdraw them from the machining point. Furthermore, the flushing liquid can also serve for cooling and/or lubrication at the machining point.

In order to keep the consumption of flushing liquid to a limited extent it is customary to channel it into a cycle, in which a filter means is designed for separating the removed material particles from the flushing liquid. For this purpose the filter means has a filter element, usually a filter fabric, through which the flushing liquid flows and on the filtration upper side of which the removed material particles accumulate as a filtration layer.

To prevent the filter element from getting clogged by the filtration layer it is common practice to clean the filter element at regular intervals and to withdraw the filtration layer. To this end the filter means can be designed as a circulating belt filter that runs through a cleaning station. To withdraw the removed material particles, which are in many cases relatively sharp-edged, the filtration layer is treated, for example, with a spray-applied cleaning fluid, through which the accumulated material particles are withdrawn from the filtration upper side. Despite such a cleaning at regular intervals the filter elements gradually clog whereby the filtration performance of the filter element is reduced and the latter then needs to be replaced.

Of prime importance here is that the smaller the pores or filtration openings of the filter element the faster it clogs. However, the filter pores of the filter element cannot be enlarged arbitrarily, because otherwise the desired high separation degree is not reached during filtration and too many material particles are returned to the machining point of the machine tool. This can increase the wear and tear of the machining tool as well as the entire machine and affect the function of the flushing liquid at the machining point.

The invention is based on the object to provide a filter means for treating a flushing liquid for material-removing machining, a filter element for this purpose as well as a method for material-removing machining, with which a high separation degree of material particles from the flushing liquid is ensured and at the same time a long service life of the filter element can be achieved.

The object is achieved on the one hand by a filter means for treating a flushing liquid for material-removing machining having the features of claim 1. Preferred embodiments of the filter means are stated in the dependent claims.

The filter means according to the invention is characterized in that the filter element has a filter fabric, on the filtration upper side of which fabric pores are designed as distinctive longitudinal slots which have a length-width ratio of greater than or equal to 4:1.

The invention is based on the finding that the clogging of a filter element is primarily caused by material particles embedding themselves almost perfectly into the filter pores or fabric openings of a filter element. On a material particle embedding itself thus into a filter pore or fabric opening, which normally is round or approximately square in shape, this results on the one hand in high adhesive forces as the particle rests against several surfaces and on the other hand such a material particle only offers little target surfaces for the cleaning liquid in order to withdraw the filtration layer.

According to the invention this difficulty is overcome by the fact that the usual uniform fabric structure with approximately square fabric openings is abandoned and a filter fabric is formed, on the filtration surface of which the filter pores are designed as distinctive longitudinal slots, the length of which is at least five times as large as the width. In material-removing machining, especially in grinding, chips or material particles of such proportions hardly ever occur. Hence, a clogging of such elongate fabric pores or fabric openings scarcely takes place so that the service life of the filter element is prolonged considerably. The material particles, which normally are approximately round in shape and the average diameter of which corresponds approximately to the width of such a slot-like fabric opening, can therefore block such an elongate fabric opening only to some extent and, in addition, only embed themselves in the latter with a reduced adhesive force. This reduced adhesive force and the remaining large target surface resulting from the increased amount of free space around the material particle permits easier and therefore better withdrawal of such a material particle from the filter element in the cleaning cycle of the filter element.

A preferred embodiment of the invention resides in the fact that the longitudinal slots have a width of greater than or equal to 10 μm. By preference, the width lies in a size range of 10 μm to 100 μm.

According to another embodiment of the invention the particle retention and the good cleaning property are improved further in that the longitudinal slots have a size ranging from 30 μm to 400 μm, preferably in the warp direction. Such a size range renders it possible that even relatively small particles can be retained reliably while a good cleaning and thus a long service life of the filter element can still be attained.

Furthermore, according to the invention it is advantageous for the filter fabric to be designed with a pore count of greater than 1200 pores/cm$^2$. By preference, provision is made for up to 2000 pores/cm$^2$ and more. As a result of such a high number of elongate pores a very fine filtration along with a continued good liquid throughput capacity is attained.

In accordance with a further embodiment of the invention it is particularly useful for the production of such a filter element that the thread count in the weft and/or warp direction ranges between 10 and 240 threads/cm. The number of threads in the weft and warp direction is harmonized in such a way that on the one hand the desired distinctive longitudinal contour of the fabric pores is achieved on the filtration upper side and on the other hand a high pore density/cm$^2$ is present.

Basically, it is possible for the longitudinal slots to be designed in the weft direction. For the production of the filter fabric it is particularly advantageous for the longitudinal slots to be designed in the warp direction of the filter fabric.

Especially for this purpose it is useful in accordance with the invention that the number of threads in the warp direction is higher than the number of threads in the weft direction. Upon a corresponding weaving the design of the longitudinal slots in the upper side of the fabric can thus be specifically attained.

Another embodiment of the invention resides in the fact that the warp threads of the filter fabric are formed as monofilament threads and the weft threads of the filter fabric as monofilament or multifilament threads. Such an arrangement permits a structure of the filter fabric of particular dimensional stability along with a high degree of flexibility, especially if the fabric is used as a circulating belt filter.

To increase the strength and the service life it is of advantage in accordance with a further development of the invention that on an underside facing away from the filtration upper side a supporting fabric is provided.

Regarding the filter element according to the invention the filter fabric preferably has a density of the warp threads which is higher at least by the factor of 5 than the density of the warp threads of the supporting fabric. Furthermore, it is advantageous if the diameter of the warp threads of the supporting fabric is greater than 2.3 in relation to the diameter of the warp threads of the filter fabric. Moreover, it is preferred that a ratio of the diameter of the weft thread of the supporting fabric to the diameter of the filter fabric is greater than or equal to 2. A good connection between the actual filter fabric and a supporting fabric is achieved in that both are interwoven with each other, in particular by means of a binding weft or a binding warp.

Advantageously, the filter fabric layer is designed with a twill or satin weave with distinctive slotted pores present in a length-width ratio of greater than 8:1. For a particularly good force absorption the supporting fabric can be woven in a Panama weave 2/2. As thread material PP, PET, PEEK or E-CTFE are preferably provided. By preference, a double fabric consisting of PET, PP or PA-monofilaments is provided. A thickness of the upper fabric layer with the elongate fabric pores is smaller than or equal to 150 µm. The thickness of the entire fabric structure and in particular of the filter element is preferably greater than 500 µm. It is of advantage if the filter element has an air permeability that is typically larger than 2500 liters/qm and sec.

The invention furthermore comprises a machining installation with a machining unit, in particular a grinding machine, for material-removing machining using flushing liquid, which has a filter means for separating removed material particles from the flushing liquid, which is characterized in that a filter means as described above is provided.

Particularly in the case of grinding installations very fine material particles that are round or approximately spherical in shape arise during grinding which show a strong tendency to clog customary filter cloths very quickly. By way of the filter means according to the invention and a filter element according to the invention the build-up of the filter cake can in many cases be influenced in such a way that the increase of the flow resistance is reduced significantly. Comparative tests have shown that the conventional cycle time or service life can be increased by 25% to 100%.

The machining installation has a line arrangement, by means of which the flushing medium enriched with material particles is pumped by a pump to the filter means. Due to a pressure differential that can be generated by overpressure, underpressure or gravitational pressure in the filter means the flushing liquid runs through the filter fabric designed in accordance with the invention. The pressure differential can lie in the range of 1 bar, by preference 0.8 bar. The flushing medium devoid of the material particles is then led via a return line into a storage tank, from which the flushing liquid can be repumped to the machining point at the machining unit.

In the machining installation the filter element in the filter means can be replaced discontinuously or continuously, e.g. as a circulating filter belt.

The invention furthermore relates to a filter element, in particular for the filter means described above. This filter element is characterized in that the filter element has a filter fabric, on the filtration upper side of which the fabric pores are designed as distinctive longitudinal slots which have a length-width ratio of greater than or equal to 5:1. By preference, the ratio amounts to a size of greater than or equal to 8:1. A filter element of this type with such a filter fabric is particularly suitable for the filtration of removed material particles from flushing liquids in material-removing machining. The filter element can also be used for the filtration of suspensions in the field of chemistry, mining and environmental technology, in which comparable material particles also have to be filtered out. The filter element can be employed on continuous or discontinuous filter devices, such as vacuum belt filters, rotary drum filters and a variety of other known filter devices.

The invention furthermore comprises a method for material-removing machining, wherein the removed material particles are led away by a flushing liquid and separated from the flushing liquid by a filter means, wherein a filter means as described above is used.

The invention claimed is:

1. A filter means for treating a flushing liquid for material-removing machining, with a filter element, through which the flushing liquid can be passed for separating removed material particles,
characterized in that
the filter element has a filter fabric, on the filtration upper side of which fabric pores are designed as distinctive longitudinal slots which have a length-width ratio of at least 4:1 and
in that on an underside facing away from the filtration upper side a supporting fabric is provided which is interwoven with the filter fabric by a binding weft or a binding warp.

2. The filter means according to claim 1,
characterized in that
the longitudinal slots have a width of at least 10 µm.

3. The filter means according to claim 1,
characterized in that
the longitudinal slots have a size ranging from 30 µm to 400 µm, preferably in the warp direction.

4. The filter means according to claim 1,
characterized in that
the filter fabric is designed with a pore count of greater than 1,200 pores/cm$^2$.

5. The filter means according to claim 1,
characterized in that
the thread count in the weft or warp direction ranges between 10 and 240 threads per cm.

6. The filter means according to claim 1,
characterized in that
the longitudinal slots are designed in the warp direction of the filter fabric.

7. The filter means according to claim 1,
characterized in that
the number of threads in the weft direction is higher than the number of threads in the warp direction.

8. The filter means according to claim 1,
characterized in that
the warp threads of the filter fabric are formed as monofilament threads and the weft threads of the filter fabric as monofilament or multifilament threads.

9. The filter means according to claim 1,
characterized in that
a ratio of the diameter of the warp thread of the supporting fabric to the diameter of the warp thread of the filter fabric is greater than 2.3 and
in that a ratio of the diameter of the weft thread of the supporting fabric to the diameter of the weft thread of the filter fabric is greater than or equal to 2.

10. A machining installation with a machining unit, in particular a grinding machine, for material-removing machining using flushing liquid, which has a filter means for separating removed material particles from the flushing liquid,
characterized in that
the filter means according to claim 1 is provided.

11. The filter element, in particular for the filter means according to claim 1,
characterized in that
the filter element has a filter fabric, on the filtration upper side of which the fabric pores are designed as distinctive longitudinal slots which have a length-width ratio of at least 4:1.

12. A method for material-removing machining, wherein the removed material particles are led away by a flushing liquid and separated from the flushing liquid by a filter means,
characterized in that
the filter means according to claim 1 is used.

* * * * *